Nov. 19, 1935.  E. W. CURTIS  2,021,176

REPAIR PLUG

Filed June 29, 1934

INVENTOR:
Eugene W. Curtis
BY
Kent W. Worrell
ATTORNEY.

Patented Nov. 19, 1935

2,021,176

UNITED STATES PATENT OFFICE 2,021,176

REPAIR PLUG

Eugene W. Curtis, Chicago, Ill.

Application June 29, 1934, Serial No. 733,021

8 Claims. (Cl. 138—98)

This invention relates in general to a repair plug applicable from the outside of a tank, pipe or container for permanently repairing large or small holes, cracks, leaky rivets, or seams therein.

An important object of the invention is the provision of a malleable metal repair plug which is inserted in the hole from the outside of the tank or other container while in use and includes means for applying it by compression to the inner and outer sides of the wall to permanently seal the hole, crack or seam to which it is applied.

A further object of the invention is the provision of an expansible ring or cap at the inner end of the malleable metal element of the plug, for more effectively compressing it in sealing the hole.

My invention also contemplates the employment of two or more of the repair plugs in juxtaposition for closing or sealing a crack in a tank or other container, and in the use of the repair plugs in connection with a sealing plate for repairing a hole larger than the plug itself.

Other objects of the invention will appear hereinafter, and the accompanying drawing illustrates a preferred embodiment of the invention and examples of its use.

In the drawing, Fig. 1 is a sectional view of a container showing the application of a repair plug in accordance with this invention preliminary to the compression of the sealing element action thereof;

Figure 1:
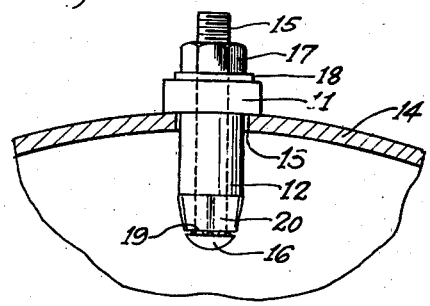

Among the objections to repair plugs of the metal sealing type are, that the metal does not seal on both sides of the tank or wall to which it is applied; that the tightening bolt if drawn up too tightly will pull through the metal; that no adequate means is provided for spreading the metal on the inside of the tank; and that adequate provision is not made for preventing the draw-up or tightening bolt from twisting with respect to the soft metal and thereby preventing it from being drawn up tightly.

The present repair plug includes a metal ferrule which expands when compressing the malleable metal element of the plug into an inner flange to produce an inner seal, an outer seal, and a seal expanded in the hole. By placing a number of the repair plugs, hereinafter specifically described, along a crack or seam, the natural expansion of the sealing metal will force it tightly together both inside and outside so that a seal is afforded not only for a single hole but also for a crack or seam of considerable length. It is also contemplated as will hereinafter appear, to use a number of these sealing plugs for attaching a plate in the nature of a metal patch to cover a hole of a size too large for a single plug.

Referring now more particularly to the drawing, the sealing element of the repair plug comprises a tubular body 12 of malleable metal such as lead, babbitt, and the like, with an integral head 11 of the same material at one end thereof, said head being either round or square, it being essential that the tubular body portion be of approximately the same diameter as the hole 13 through which it is adapted to pass in the wall 14 of a tank, receptacle, or other object it is desired to repair. Extending through this sealing element of the repair plug is a threaded bolt 15 with its head 16 at the inner end of the tubular body portion and of the same diameter as said tubular portion so as to pass through the hole in the tank, the threaded end of the bolt extending well beyond the head 11 and fitted at this end with a draw-up nut 17 and a washer 18 which latter may be either round or square in shape.

The inner or under surface of the head of the bolt is preferably formed with a toothed or gripping surface 19 for preventing it from turning if directly in contact with the sealing element or with a dished washer interposed between it and the sealing element, said washer being in the form of a ferrule or expansible compression ring 20 and is slipped over the bolt before the latter is passed through the tubular sealing element to receive the washer 18 and nut 17 in completing the assembly of the repair plug.

Figures 9, 10:
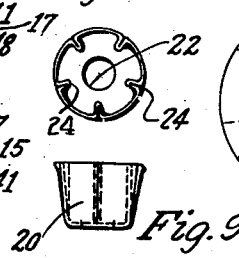
Fig. 9 is a side elevation of a complete compression ring.
Fig. 10 is a bottom plan view of a compression ring.
Figure 8:
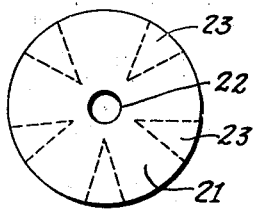
Fig. 8 is a blank from which a compression ring is made.
Figure 7:
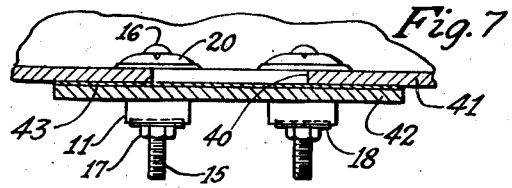
Fig. 7 is a section taken on the line 7—7 of Fig. 6.

This ferrule or expansible compression ring 20, as shown more clearly in Figs. 8, 9 and 10, is preferably formed of a circular disc 21 of sheet metal such as annealed brass compressed in the form of a cup as shown in Fig. 9, and it may be crimped by pressing inwardly a number of angular portions 23 about the edges thereof to form integral ribs 24 within the cup-shaped ferrule when it is completed, the ribs either extending inwardly or lying flatly against the internal surface of the cup.

Figure 2:
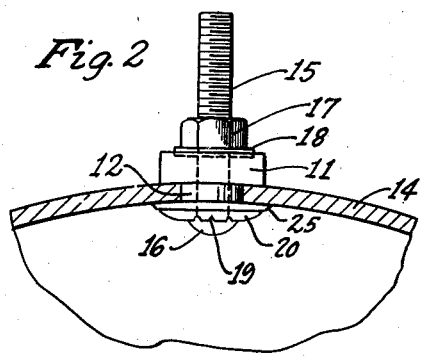
Fig. 2 illustrates the repair plug in place with the sealing element compressed.
Figure 3:
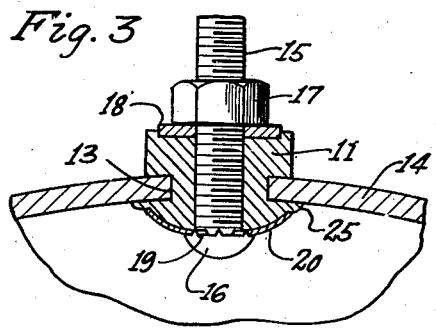
Fig. 3 is an enlarged sectional view of the sealing plug in place.

The action of the expansible compression ring or ferrule when drawn up tightly against the inner end of the sealing element of the plug within a tank or receptacle is clearly shown in Figs. 2 and 3, the outer edge of the ferrule expanding under pressure of the head of the bolt 15 and forcing the malleable metal of the tubular body portion 12 into a flange ring 25 within the receptacle 14 as clearly shown in Fig. 3. When properly expanded the ferrule will be slightly dished, as indicated in Fig. 3, flattening out the ribs 24 and with the expanded edge of the ferrule slightly spaced from the inner surface of the tank by the malleable metal of the sealing element, which latter is not only crowded into the hole but also intimately engages the inner and outer surfaces of the tank around the hole so as to hermetically seal the tank at this point and thereby effect a permanent repair.

It will be obvious that the repair plug is a complete assembly when sold to the trade and that when one of these plugs is used it will produce a firm and intimate joint, the mushrooming effect of the compressible material inside of the tank forming an inside seal for a hole, the material outside of the hole forming an outside seal, and the material expanding within the hole forming a closed seal for that portion.

Figures 4, 5:
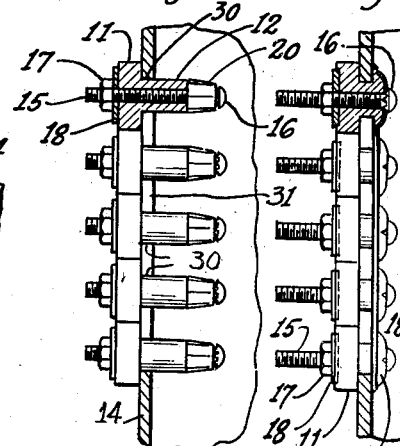
Figs. 4 and 5 illustrate a number of plugs before and after application in the sealing of a crack or seam.
Figure 5A:
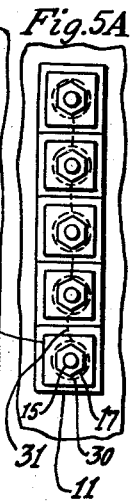
Fig. 5A is an outer elevation of the structure of Fig. 5.
Figure 6:
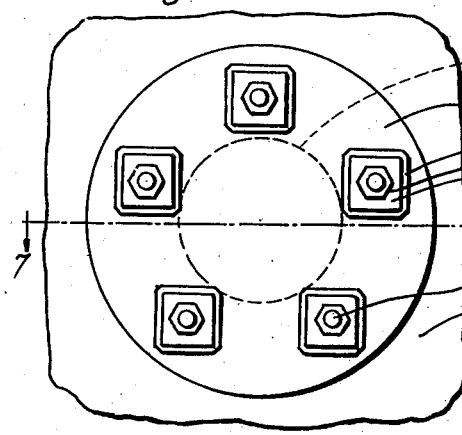
Fig. 6 illustrates a patch as applied by a number of sealing plugs.

In order to seal an open seam or a crack in the receptacle as represented in Figs. 4 and 5, a number of these plugs are inserted in properly spaced holes drilled along the crack 31 with the outer heads 11 of the malleable metal sealing element actually in contact with each other or nearly so, whereby when the bolts of the repair plugs are drawn up tightly as shown in Fig. 5 and Fig. 5A, the compression of the inner portion of the sealing elements coupled with the compression of the heads exerts considerable pressure on the metal so that the portions along the seams are drawn up more tightly than the corners of the heads because they receive a greater compressing effect along the seam which therefore produces a continuous seal along the outer surface of the crack, and with the metal compressed within the crack produces a continuous triple seal for the entire length of the crack similar to the seal for a single opening.

It will be understood that the repair plugs are to be made in varying sizes to the extent of practicable manipulation, but in repairing a large opening, as 40, in the wall 41 of a receptacle or other object a sealing plate 42 somewhat larger than the opening is placed over it, and near the edges of the plate a number of holes are drilled through the plate and continued through the wall of the receptacle for inserting a corresponding number of repair plugs therethrough. A gasket or other sealing material 43 may be interposed between the surface of the wall 41 and the inner surface of the plate 42 to provide a more efficient seal. The tightening of the sealing plugs will draw the plate 42 tightly against the receptacle 41, thereby forming an efficient seal for the plug openings as well as bring the plate up tightly against the wall of the receptacle 41. The number of sealing plugs necessary for holding a repair plate of this kind in position depends upon the size of the opening, the pressure to be applied thereto, and the thickness of the material both of the hole to be sealed and the repair plate.

In applying my improved repair plug in stopping a hole in the wall of a tank, pipe, or other container, the hole is preferably well defined by means of a drill and after selecting a repair plug of a corresponding size the smaller end thereof is passed into the hole so that the head 11 of the sealing element will bear against the outer side of the wall, and then by holding said sealing element by a wrench engaging the head thereof turning of the nut upon the threaded end of the bolt will compress the tubular body portion of the malleable metal sealing element through the instrumentality of the expansible compression ring 20 and at the same time the malleable metal head 11 of the sealing element will be compressed in the opposite direction, resulting in an effective compression of the malleable metal element of the plug to seal the hole and compress the metal around the hole at the inner and outer sides of the wall, each surrounding body of metal being pressed tightly against the wall of the tank and materially augmenting the sealing of the hole proper. In this operation the nut 17 is turned on the bolt until sufficient compression is obtained, forming an inner and outer seal, and of course as the pressure continues the washer 18 becomes embedded in the head 11 as shown more clearly in Fig. 3.

After the plug has been sufficiently tightened in place, the outer end of the bolt and even the draw-up nut 17 may be removed, thus allowing a smooth outer surface to be made of the head 11. This is also true of a series of plugs inserted along a crack or seam to seal it, the heads 11 of such a seal being substantially fused or at least tightly compressed together so that they appear to be continuous and to make a smooth continuous patch for the length of the seam.

I claim:

1. A sealing plug of expansible metal having a head, larger than a hole it is to seal, and a reduced portion, insertable through the hole, a bolt extending through the head and reduced portion, and an expansive ferrule bearing against the head of the bolt and insertable through the hole and by it compressible to expand the reduced portion, and means bearing against the head of the plug and adapted to draw on the bolt to compress the ferrule and expansible metal of the plug.

2. A sealing plug of expansible metal having a head, larger than the hole it is to seal, and a reduced portion insertable through the hole, a bolt extending through the head and reduced portion and having its head at the outer end of the reduced portion, a metal ferrule between the bolt head and reduced portion insertable through the hole with said bolt head and reduced portion, said ferrule having a skirt expansible with the reduced portion of the expansible metal plug and expansible with it when the bolt is drawn up to apply the plug, and means for drawing up the bolt.

3. A sealing plug of expansible metal having a head, larger than a hole it is to seal, and a reduced portion insertable through the hole, a bolt extending through the plug and having a head at the end of the reduced portion with anti-slip teeth on the under side of the head, a metal ferrule insertable through the hole in contact with said teeth and in expansible engagement with the adjacent end of the reduced portion, and means for drawing up the bolt to compress the ferrule and expansible metal plug between the head of the bolt and said drawing up means.

4. A sealing plug of expansible metal having a head, larger than a hole it is to seal, and a reduced portion insertable through the hole, a bolt extending through the plug and having a head at the end of the reduced portion with teeth on the under side of the head, a cup-shaped metal ferrule abutting the teeth and having an expansible skirt engaging the metal of said reduced portion and expansible with it when the bolt is drawn up to apply the plug, and means for drawing up the bolt to compress the ferrule and expansible metal plug between the head of the bolt and said draw up means.

5. A sealing plug of expansible metal having a head, larger than a hole it is to seal, and a reduced portion insertable through the hole, a bolt extending through the plug and having a head at the outer end of the reduced portion, a cupped metal ferrule extending over the end and around the edge of said reduced portion and insertable through a hole therewith, the ferrule being less expansible than the metal of the plug to flatten out the latter when the bolt is drawn up, and means for drawing up the bolt to compress the ferrule and expansible metal plug between the head of the bolt and said draw up means.

6. A repair plug of expansible metal, comprising a body having a square head larger than the hole it is to seal and a reduced portion insertable in the hole and approximating the diameter thereof, a bolt extending through the plug with its head at the end of the reduced portion, a metal ferrule comprising a cap fitting over the end of the reduced portion and against the bolt head and having expansible sides, a draw up nut at the other end of the bolt, and a washer between the nut and the square head of the body and operative to expand said square head about its shortest diameters when the plug is compressed by the bolt and nut.

7. A seal for a wall crack or seam having spaced apart holes drilled through the same, said seal being characterized by a plurality of plugs inserted in the holes and each comprising a tubular body of expansible metal with an enlarged angular head at the outer side of the wall, the heads of the several plugs being in intimate contact with each other, a bolt extending through each plug with the head of the bolt at the inner side of the plug, and an expansible washer between the head of the bolt and expanded metal of the plug, said washer and metal of the plug being expanded to a diameter larger than the diameter of the hole, whereby the metal of the plugs is crowded in the holes and crack as well as against the inner and outer sides of the wall with the heads of the plugs forming a continuous patch.

8. A seal for a wall crack or seam having spaced apart holes drilled through the same, said seal being characterized by a plurality of plugs inserted in the holes and each comprising a tubular body of expansible metal with an enlarged angular head at the outer side of the wall, the heads of the several plugs being in intimate contact with each other, a bolt extending through each plug with its head at the inner side of the plug, an expansible washer between the head of the bolt and expanded metal of the plug, said washer and metal of the plug being expanded to a diameter larger than the diameter of the hole, and a nut threaded on the outer end of the bolt against the enlarged head of the plug for clamping the plug in place, whereby the metal of the plugs is crowded in the holes and crack as well as against the inner and outer sides of the wall with the heads of the plugs forming a continuous patch.

EUGENE W. CURTIS.